(12) United States Patent
Liao

(10) Patent No.: US 12,004,681 B2
(45) Date of Patent: Jun. 11, 2024

(54) BEVERAGE COOLING DEVICE

(71) Applicant: ELEGANCE REFRIGERATION CORPORATION, New Taipei (TW)

(72) Inventor: Tsun-I Liao, New Taipei (TW)

(73) Assignee: ELEGANCE REFRIGERATION CORPORATION, New Taipei (TW)

( * ) Notice: Subject to any disclaimer, the term of this patent is extended or adjusted under 35 U.S.C. 154(b) by 325 days.

(21) Appl. No.: 17/563,090

(22) Filed: Dec. 28, 2021

(65) Prior Publication Data

US 2022/0211208 A1    Jul. 7, 2022

(30) Foreign Application Priority Data

Jan. 4, 2021    (TW) .................................. 110100106

(51) Int. Cl.
| | | |
|---|---|---|
| *B08B 9/032* | (2006.01) | |
| *A47J 31/46* | (2006.01) | |
| *A47J 31/60* | (2006.01) | |

(52) U.S. Cl.
CPC ............. *A47J 31/60* (2013.01); *A47J 31/462* (2013.01); *B08B 9/0325* (2013.01)

(58) Field of Classification Search
CPC ................................ B67D 1/0864; B67D 1/07
USPC ...................................................... 222/146.6
See application file for complete search history.

(56) References Cited

U.S. PATENT DOCUMENTS

| 4,907,417 A | * | 3/1990 | Forsythe ............... | F25D 31/002 |
| | | | | 62/201 |
| 5,839,291 A | * | 11/1998 | Chang ................... | B67D 1/0864 |
| | | | | 62/126 |
| 2007/0204884 A1 | * | 9/2007 | Moore ................... | B08B 9/0321 |
| | | | | 134/166 C |
| 2009/0194564 A1 | * | 8/2009 | Tsubouchi ............ | G01F 15/046 |
| | | | | 222/61 |
| 2010/0276451 A1 | * | 11/2010 | Tachibana ................ | B67D 1/04 |
| | | | | 222/190 |
| 2011/0042414 A1 | * | 2/2011 | Tachibana ............ | B67D 1/0864 |
| | | | | 222/129.1 |
| 2011/0220681 A1 | * | 9/2011 | Paul ......................... | B67D 1/10 |
| | | | | 222/1 |

(Continued)

FOREIGN PATENT DOCUMENTS

KR           101551473 B1  *  9/2015  ........... B67D 1/0867

OTHER PUBLICATIONS

Machine Translation of KR-101551473-B1.*

*Primary Examiner* — Jeremy Carroll

(57) ABSTRACT

The disclosure introduces a beverage cooling device, including a body, a first cooling tank, a second cooling tank, a cooling pipeline, a cleaning module and a control unit. The first cooling tank is configured in the body and filled with a first coolant; the second cooling tank is configured in the body and filled with a second coolant; the cooling pipeline includes a first pipeline and a second pipeline, wherein the first pipeline is connected to an inlet end, the second pipeline is configured in the second cooling tank and connected to the first pipeline and an outlet end; the cleaning module is configured in the body and includes a cleaning pipeline and a valve body, wherein the cleaning pipeline is connected to a cleaning liquid source and the inlet end, the valve body is connected to the cleaning pipeline, the control unit is connected to the valve body.

9 Claims, 9 Drawing Sheets

(56) References Cited

U.S. PATENT DOCUMENTS

| | | | |
|---|---|---|---|
| 2015/0321896 A1* | 11/2015 | Kobayashi | B67D 1/0864 222/54 |
| 2017/0240410 A1* | 8/2017 | Kim | B67D 1/1477 |

* cited by examiner

BEVERAGE COOLING DEVICE

CROSS-REFERENCE TO RELATED APPLICATION

This non-provisional application claims priority under 35 U.S.C. § 119(a) on Patent Application No(s). 110100106 filed in Taiwan, R.O.C. on Jan. 4, 2021, the entire contents of which are hereby incorporated by reference.

BACKGROUND OF THE INVENTION

1. Field of the Invention

The present disclosure relates to a beverage cooling device, and in particular to a beverage cooling device capable of automatically cleaning the cooling pipeline.

2. Description of the Related Art

Beverage cooling devices are common commercial cooling apparatuses that are widely used in coffee shops, hand-shaken beverage or liquor stores on the street. Since beverages are more likely to breed bacteria at a high temperature (18° C. to 70° C.), in order to quickly pass through this high temperature section and meet the different requirements of customers for the temperature of the beverage, the store must reduce the high temperature beverage to the appropriate temperature in a short period of time, and the common traditional practice is to cool down with ice cubes, but the ice cubes are still susceptible to bacterial contamination during the manufacturing process, so there are hygiene problems.

To solve the above problems, some manufacturers and R&D personnel use the method that cooling pipelines combine with coolant, so that the beverage flows through the cooling pipeline configured in the coolant to quickly be cooled, the energy loss of the compressor can be reduced to achieve energy saving effect, and the method can also prevent the beverage from freezing in the cooling pipeline, and thus the beverage is controlled at a fixed temperature, while the hygiene and flavor of the beverage are taken into account. However, when the store does not continuously provide beverages for a long time, the residual liquid of beverages left inside the cooling pipeline is easy to contaminate the pipeline or breed bacteria, and because the cooling pipeline is configured inside the device, it is difficult to immediately confirm the cleanliness of the interior. In the past, most stores artificially injected cleaning liquids such as water for washing regularly or irregularly, but the practice was not only cumbersome and time-consuming, but also prone to hygiene problems caused by omissions of shop assistants.

BRIEF SUMMARY OF THE INVENTION

The inventor exhausted his mind to research carefully, and then developed a beverage cooling device capable of automatically cleaning the cooling pipeline, with a view to achieving the effect of automating the cleaning operation and saving manpower.

The present disclosure provides a beverage cooling device, comprising a body, a first cooling tank, a second cooling tank, a cooling pipeline, a cleaning module and a control unit. The first cooling tank is configured in the body and filled with a first coolant; the second cooling tank is configured in the body and filled with a second coolant, wherein a temperature of the second coolant is lower than that of the first coolant; the cooling pipeline comprises a first pipeline and a second pipeline, wherein the first pipeline is configured in the first cooling tank and connected to an inlet end, the second pipeline is configured in the second cooling tank and connected to the first pipeline and an outlet end; the cleaning module is configured in the body and includes a cleaning pipeline and a valve body, wherein the cleaning pipeline is connected to a cleaning liquid source and the inlet end, the valve body is connected to the cleaning pipeline, the control unit is connected or electrically connected to the valve body.

In an embodiment, the second pipeline is a cascading configuration, the inlet end is suitable to inject a beverage, and a temperature of the beverage is higher than that of the second coolant.

In an embodiment, the first pipeline is coiled, the number of turns of the second pipeline is greater than the number of turns of the first pipeline, and the temperature of the beverage is higher than that of the first coolant.

In an embodiment, the first cooling tank is configured with a first temperature sensor, the second cooling tank is configured with a second temperature sensor, and each the first cooling tank and the second cooling tank is respectively configured with an intake valve and a drain valve, and the first temperature sensor, the second temperature sensor, each intake valve and each drain valve are electrically connected to the control unit. When the first temperature sensor detects that the temperature of the first coolant is higher than a first temperature threshold, the control unit opens the intake valve and the drain valve of the first cooling tank, so that the temperature of the first coolant is lower than or equal to the first temperature threshold; when the second temperature sensor detects that the temperature of the second coolant is higher than a second temperature threshold, the control unit opens the intake valve and the drain valve of the second cooling tank, so that the temperature of the second coolant is lower than or equal to the second temperature threshold.

In an embodiment, the beverage cooling device further comprises a second coolant source tank, the second coolant source is configured within the second coolant source tank, the second coolant source tank is configured with a heat exchanger and a pump, the exchanger and the pump are electrically connected to the control unit, and the intake valve and the drain valve of the second cooling tank are connected to the second coolant source tank.

In an embodiment, the beverage cooling device further comprises a beverage storage tank, the beverage storage tank is configured within the second cooling tank, and the beverage storage tank is connected between the first pipeline and the second pipeline or between the second pipeline and the outlet end.

In an embodiment, the beverage cooling device further comprises an ice making tank, the ice making tank is configured with an auxiliary chilling unit thereon, and the first pipeline or the second pipeline is connected to the ice making tank.

In an embodiment, the beverage cooling device further comprises a compressor and a chilling unit, the compressor is electrically connected to the control unit, the first cooling tank and the second cooling tank are communicated to each other, and the chilling unit is connected between the compressor and the second cooling tank.

In an embodiment, the beverage cooling device further comprises a heat dissipation unit, the heat dissipation unit is connected to the compressor and electrically connected to the control unit.

In an embodiment, tank walls of the first cooling tank and the second cooling tank are made of heat insulating materials.

Therefore, the beverage cooling device of the disclosure can open the valve body through the control unit when no beverage is provided, and the cleaning liquid is introduced through the cleaning pipeline to inject and clean the cooling pipeline from the inlet end, thereby achieving the effect of automating the cleaning operation and saving manpower.

To facilitate understanding of the above characteristics and advantages of the present disclosure, embodiments together with the attached drawings for the detailed description of the present disclosure are provided as below.

DETAILED DESCRIPTION OF THE INVENTION

Figure 1:
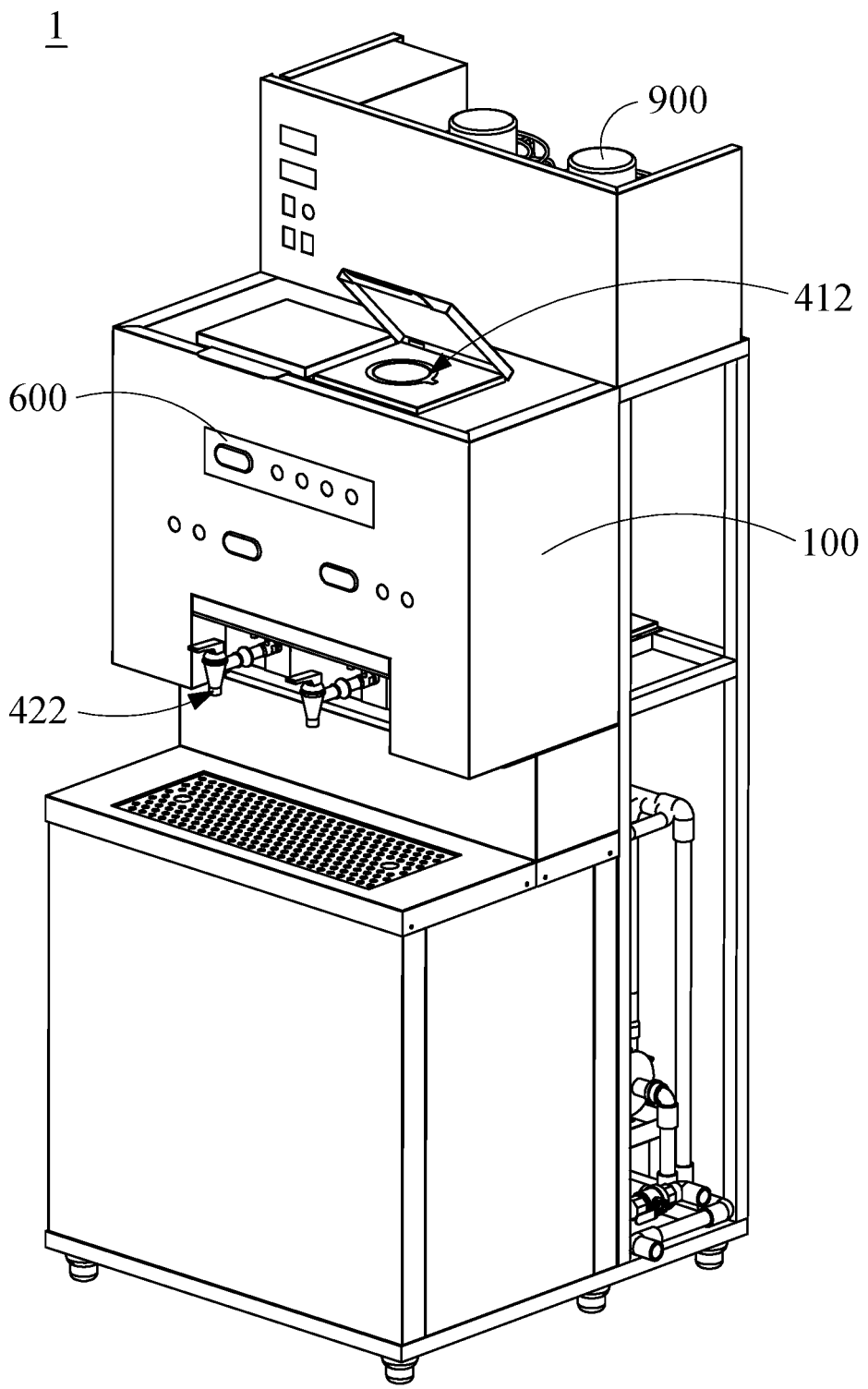
FIG. 1 is a schematic perspective view of a beverage machine carrying a beverage cooling device according to an embodiment of the present disclosure.

The aforementioned and other technical contents, characteristics and effects of the present disclosure can be clearly presented by the detailed description of preferable embodiments together with the attached drawings. It's worth mentioning that the direction terms mentioned in the following embodiments, such as: top, bottom, left, right, front or back are only referred to the direction of the drawings. Therefore, the directional terms used are intended to illustrate, not to limit, the disclosure. In addition, in the following embodiments, the same or similar components will use the same or similar reference numerals.

Figure 2:
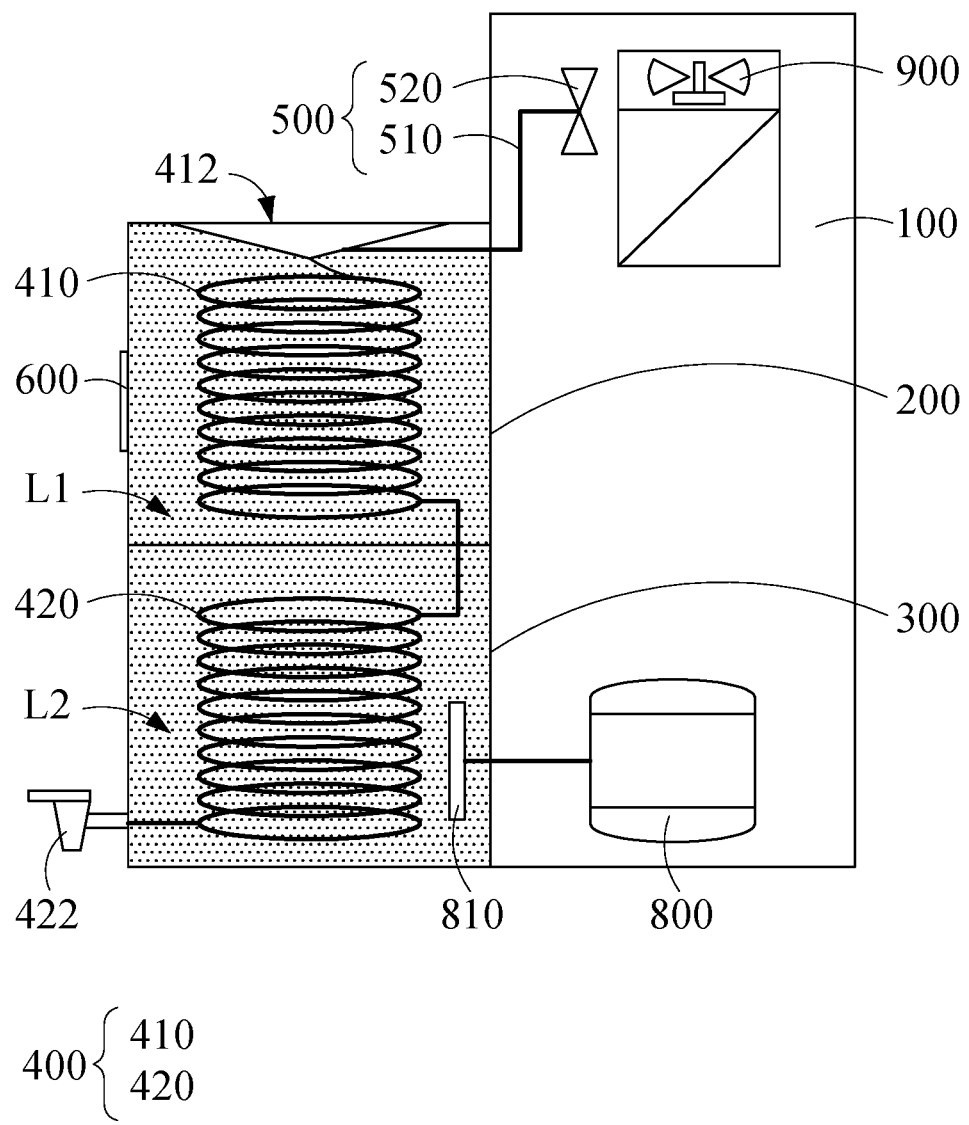
FIG. 2 is a schematic view of internal elements of the beverage cooling device in FIG. 1.

Referring to FIGS. 1 and 2, FIG. 1 is a schematic perspective view of a beverage machine carrying a beverage cooling device according to an embodiment of the present disclosure, and FIG. 2 is a schematic view of internal elements of the beverage cooling device in FIG. 1. The beverage cooling device 1 of the present embodiment is suitable for being mounted in a beverage machine for cooling a beverage, and the beverage cooling device 1 comprises a body 100, a first cooling tank 200, a second cooling tank 300, a cooling pipeline 400, a cleaning module 500 and a control unit 600, wherein the first cooling tank 200 is configured in the body 100 and filled with a first coolant L1; the second cooling tank 300 is configured in the body 100 and filled with a second coolant L2; the cooling pipeline 400 includes a first pipeline 410 and a second pipeline 420, wherein the first pipeline 410 is configured in the first cooling tank 200 and connected to an inlet end 412, the second pipeline 420 is configured in the second cooling tank 300 and connected to the first pipeline 410 and an outlet end 422; the cleaning module 500 is configured in the body 100 and includes a cleaning pipeline 510 and a valve body 520, wherein the cleaning pipeline 510 is connected to a cleaning liquid source and the inlet end 412, the valve body 520 is connected to the cleaning pipeline 510; the control unit 600 is electrically connected to the valve body 520.

In detail, the beverage cooling device 1 adopts a two-stage cooling method to cool the beverage, the user may inject a high temperature (e.g., more than 70° C.) beverage from the inlet end 412, and the beverage sequentially passes through the first pipeline 410 and the second pipeline 420 for cooling, and finally outflows from the outlet end 422 to form an ice-cold beverage with a low temperature (e.g., −5° C.). In the embodiment, the first coolant L1 and the second coolant L2, for example, are water, and the temperature of the first coolant L1 is room temperature (about 25° C.), while the temperature of the second coolant L2 is maintained between −5° C. to −15° C., in other words, the temperature of the second coolant L2 is lower than that of the first coolant L1, and the beverage machine may be configured as shown in FIG. 1 with a first cooling tank 200 and a second cooling tank 300 each on the left and right sides, thereby injecting different beverages to provide more choices, or the number of cooling tank sets is increased to more than three sets to form a variety of beverage machines, the present disclosure does not limit these matters.

It is worth mentioning that the shape of the inlet end 412 is designed as a funnel in the embodiment, which allows the injected beverage to flow smoothly into the first pipeline 410 and reduces residues. On the other hand, the cooling pipeline 400 is made of stainless steel, allowing the heat of the beverage flowing through the first pipeline 410 and the second pipeline 420 to be quickly transferred to the first coolant L1 and the second coolant L2 for cooling, and the tank walls of the first cooling tank 200 and the second cooling tank 300 are made of heat insulating materials such as foaming materials, and even if the second coolant L2 is maintained at an overcooling temperature below 0° C., it is not easy to form ice crystal cores when the tank walls are smooth, so it does not freeze to reduce the flow of coolant.

In addition, the first pipeline 410 and the second pipeline 420, for example, are formed by using DN9 pipes (average inner diameter of 9 mm) and are presented coiled as shown in FIG. 2, in other words, the first pipeline 410 and the second pipeline 420 may be arranged as flat coils like mosquito coils, or spiral coils formed in three-dimensional space as shown in FIG. 2, and since the high temperature beverage is mainly cooled by the low temperature second coolant L2 in the second cooling tank 300, therefore, in the design, the number of turns of the second pipeline 420 is designed to be greater than the number of turns of the first pipeline 410, in the present embodiment, the number of laps of the first pipeline 410 and the second pipeline 420 are respectively 9 and 14 turns, but the present disclosure does not limit the actual number of turns, so that the beverage that has a temperature higher than that of the first coolant L1 can be cooled into an ice-cold beverage for customers to drink in a very short period of time by normal temperature cooling and low temperature cooling.

On the other hand, the valve body 520, for example, is a solenoid valve, and the control unit 600 has an electronic control panel that can be operated by a finger, when a store has not provided beverages during a long period of time, beverage residues in the cooling pipeline 400 easily contaminate the pipeline and breed bacteria, at this time the user can operate the control unit 600 to open valve body 520, so that the cleaning fluid (e.g., water) flows through the cleaning pipeline 510 and injects into the inlet end 412 from the cleaning liquid source, and passes through the first pipeline 410 and the second pipeline 420 in sequence, finally, is discharged from the outlet end 422, thereby cleaning the inside of the cooling pipeline, which can automate the cleaning process and eliminate the inconvenience of manual cleaning.

Obviously, the valve body 520 can also be a mechanical liquid valve such as a tap, and the control unit 600 is a mechanism corresponding to the above mechanical liquid valve, and the effect of automatic cleaning can also be achieved by connecting the control unit 600 to the valve body 520.

In addition, the control unit 600 may further be set with a timing unit, and a predetermined automatic cleaning interval of the beverage cooling device 1 is inputted by the user in advance, so that when a fixed time interval is passed, the control unit 600 will automatically open the valve body 520 and carry out the cleaning process, which can prevent the user from missing the operation and causing residual liquid contamination of the pipeline or bacteria breeding.

Preferably, the beverage cooling unit 1 further comprises a compressor 800 and a chilling unit 810, wherein the compressor 800 is electrically connected to the control unit 600, while the chilling unit 810, for example, is a copper pipe, the first cooling tank 200 and the second cooling tank 300 are communicated to each other through a pipeline or opening, etc., and the chilling unit 810 is connected between the compressor 800 and the second cooling tank 300. When the temperature of the first coolant L1 or the second coolant L2 gradually increases because of cooling the beverage, the compressor 800 compresses the refrigerant and injects into the chilling unit 810, allowing the second coolant L2 and the interconnected first coolant L1 to dissipate heat quickly, thus maintaining the cooling capacity of the beverage cooling unit 1. Preferably, the beverage cooling unit 1 further comprises a heat dissipation unit 900, wherein the heat dissipation unit 900, for example, is a fan, which is connected to the compressor 800 and electrically connected to the control unit 600. When the compressor 800 performs the above operation and gradually accumulates heat, the control unit 600 can start the operation of the heat dissipation unit 900, thus the heat of the compressor 800 is dissipated to the outside of the body 100.

Figure 3:
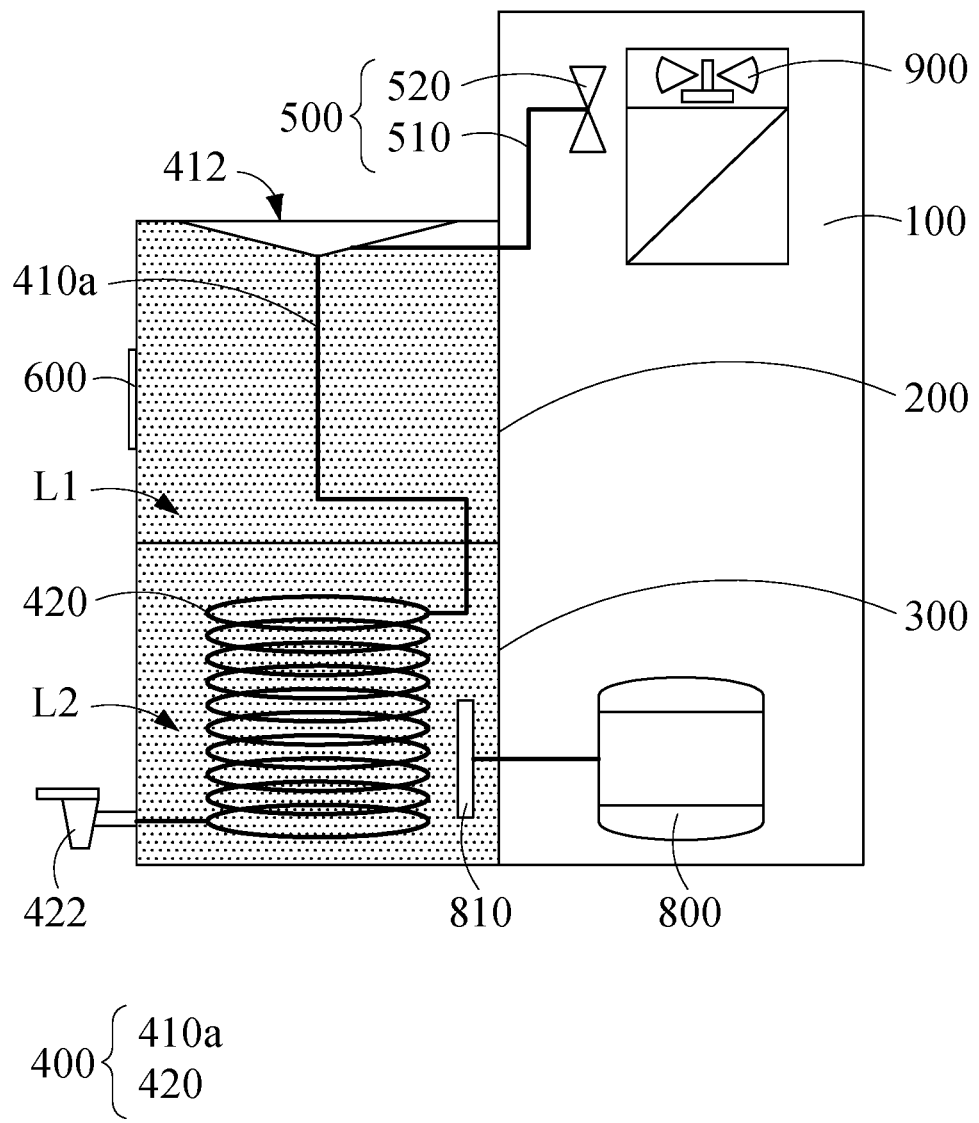
FIG. 3 is a schematic view of the internal elements of the beverage cooling device according to a second embodiment of the present disclosure.

Referring to FIG. 3, FIG. 3 is a schematic view of the internal elements of the beverage cooling device according to a second embodiment of the present disclosure. The beverage cooling device 1a of the present embodiment is similar to the beverage cooling device 1 of FIG. 2, the main difference between the two of them is that: the first pipeline 410a is not coiled but substantially extends straightly.

Some beverage manufacturers will first cool beverages with the other cooling devices (such as household refrigerators) in the process of preparation of the beverages, and then the beverages are injected into the beverage machine for sale. In this situation, although the temperature of the injected low temperature beverage is higher than the temperature of the second coolant L2, there is no need to cool through the first cooling tank 200, so the shape of the first pipeline 410a is designed to extend straight, thus the time of the beverage flowing in the first pipeline 410a can be decreased, the beverage can quickly flow into the second pipeline 420, and be cooled by the second coolant L2.

Figure 4:
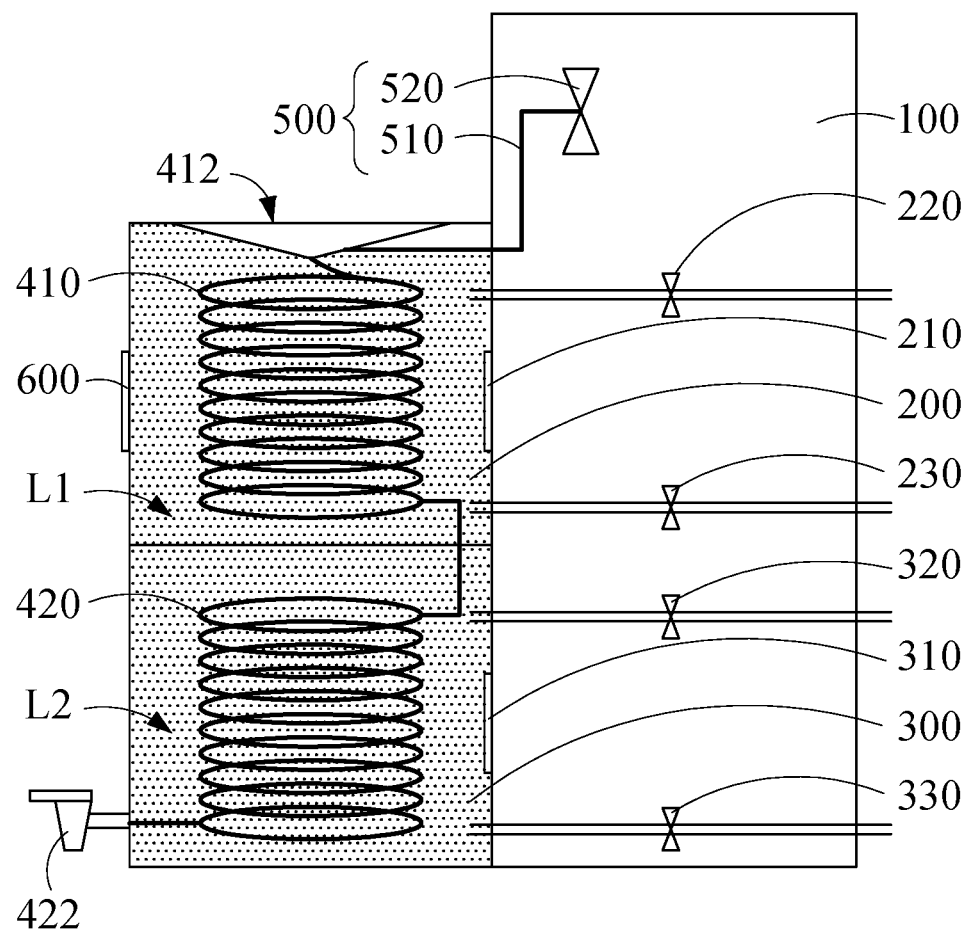
FIG. 4 is a schematic view of the internal elements of the beverage cooling device according to a third embodiment of the present disclosure.

Referring to FIG. 4, FIG. 4 is a schematic view of the internal elements of the beverage cooling device according to a third embodiment of the present disclosure. The beverage cooling device 1b of the present embodiment is similar to the beverage cooling device 1 of FIG. 2, the main differences between the two of them are: the first cooling tank 200 is configured with a first temperature sensor 210, the second cooling tank 300 is configured with a second temperature sensor 310, the first cooling tank 200 is configured with an intake valve 220 and a drain valve 230, the second cooling tank 300 is configured with an intake valve 320 and a drain valve 330, and the first temperature sensor 210, the second temperature sensor 310, each intake valve 220, 320 and each drain valve 230, 330 are electrically connected to the control unit 600.

In the present embodiment, the first cooling tank 200 and the second cooling tank 300 maintain the temperatures of the first coolant L1 and the second coolant L2 by changing the coolants. Specifically, the intake valve 220 of the first cooling tank 200 is connected to a first coolant source, when the first temperature sensor 210 detects that the temperature of the first coolant L1 is higher than a first temperature threshold (e.g., 25° C. to 30° C.), the control unit 600 will open the intake valve 220 and the drain valve 230 of the first cooling tank 200, so that the first coolant L1 having a lower temperature in the first coolant source is injected into the first cooling tank 200, and the rising temperature first coolant L1 outflows through the drain valve 230, thus the temperature of the first coolant L1 is lower than or equal to the first temperature threshold, thereby maintaining the cooling capacity of the first cooling tank 200.

Similarly, the intake valve 320 of the second cooling tank 300 is connected to a second coolant source, when the second temperature sensor 310 detects that the temperature of the second coolant L2 is higher than a second temperature threshold (e.g., −5° C. to 0° C.), the control unit 600 will open the intake valve 320 and the drain valve 330 of the second cooling tank 300, so that the second coolant L2 having a lower temperature in the second coolant source is injected into the second cooling tank 300, and the rising temperature second coolant L2 outflows through the drain valve 330, thus the temperature of the second coolant L2 is lower than or equal to the second temperature threshold, thereby maintaining the cooling capacity of the second cooling tank 300.

Preferably, the first cooling tank 200 and the second cooling tank 300 are further formed an overflow port thereon to limit the levels of the first coolant L1 and the second coolant L2 to specific heights, in order to prevent the intake valves 220, 320 from injecting with too much coolant.

Figure 5:
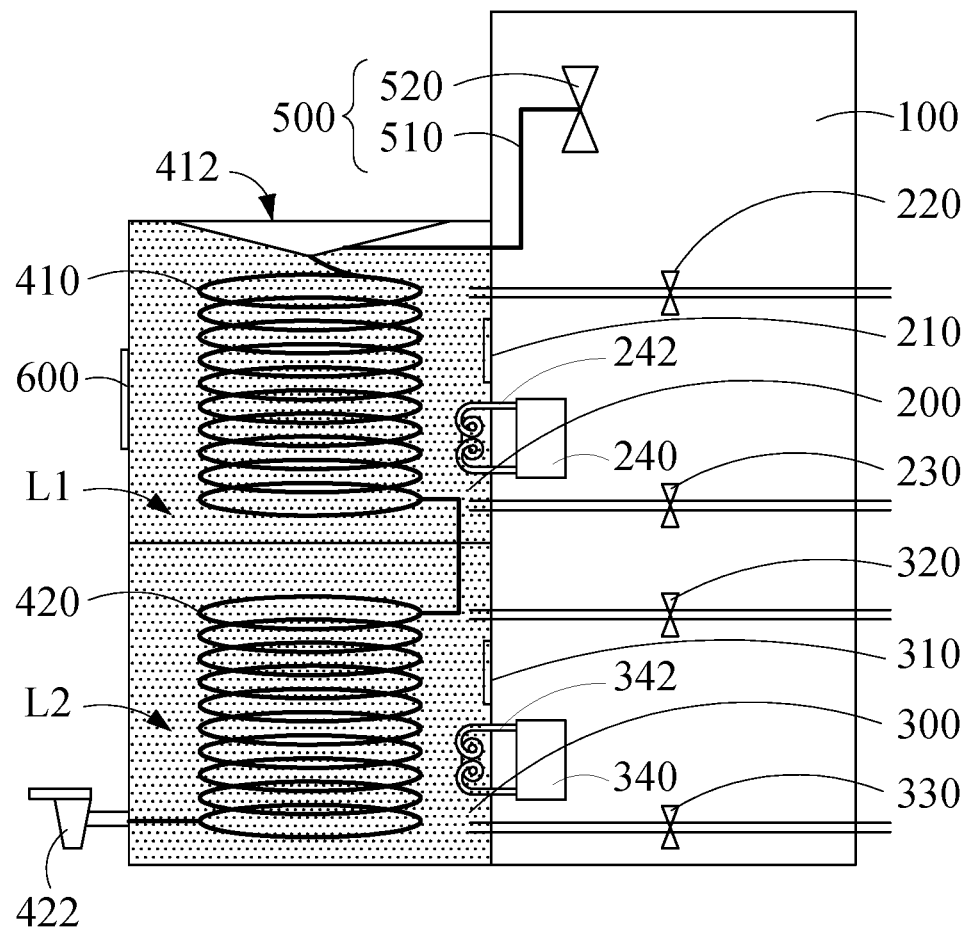
FIG. 5 is a schematic view of the internal elements of the beverage cooling device according to a fourth embodiment of the present disclosure.

Referring to FIG. 5, FIG. 5 is a schematic view of the internal elements of the beverage cooling device according to a fourth embodiment of the present disclosure. The beverage cooling device 1c of the present embodiment is similar to the beverage cooling device 1b of FIG. 4, the main differences between the two of them are: the first cooling tank 200 is further configured with a first chilling unit 240 thereon, and the second cooling tank 300 is further configured with a second chilling unit 340, wherein each the first chilling unit 240 and the second chilling unit 340, for example, is a compressor.

In detail, the first coolant L1 and the second coolant L2 that are injected through the intake valves 220, 320 by some manufacturers may be maintained at room temperature, in this situation, the first coolant L1 and the second coolant L2 need to be cooled by the first chilling unit 240 and the second chilling unit 340. As shown in FIG. 5, the first chilling unit 240 is configured with a first chilling pipeline 242, and the second chilling unit 340 is configured with a second chilling pipeline 342, wherein the first chilling pipeline 242 and the second chilling pipeline 342 are respectively filled with refrigerant. Thus, when the first chilling unit 240 and the second chilling unit 340 operate such that the refrigerant flows along the first chilling pipeline 242 and the second chilling pipeline 342, even if the first coolant L1 and the second coolant L2 are introduced with a coolant having a normal temperature, the coolant in the tank can still be maintained below a predetermined temperature range through the first chilling unit 240 and the second chilling unit 340, thereby ensuring the cooling capacity of the first cooling tank 200 and the second cooling tank 300.

Figure 6:
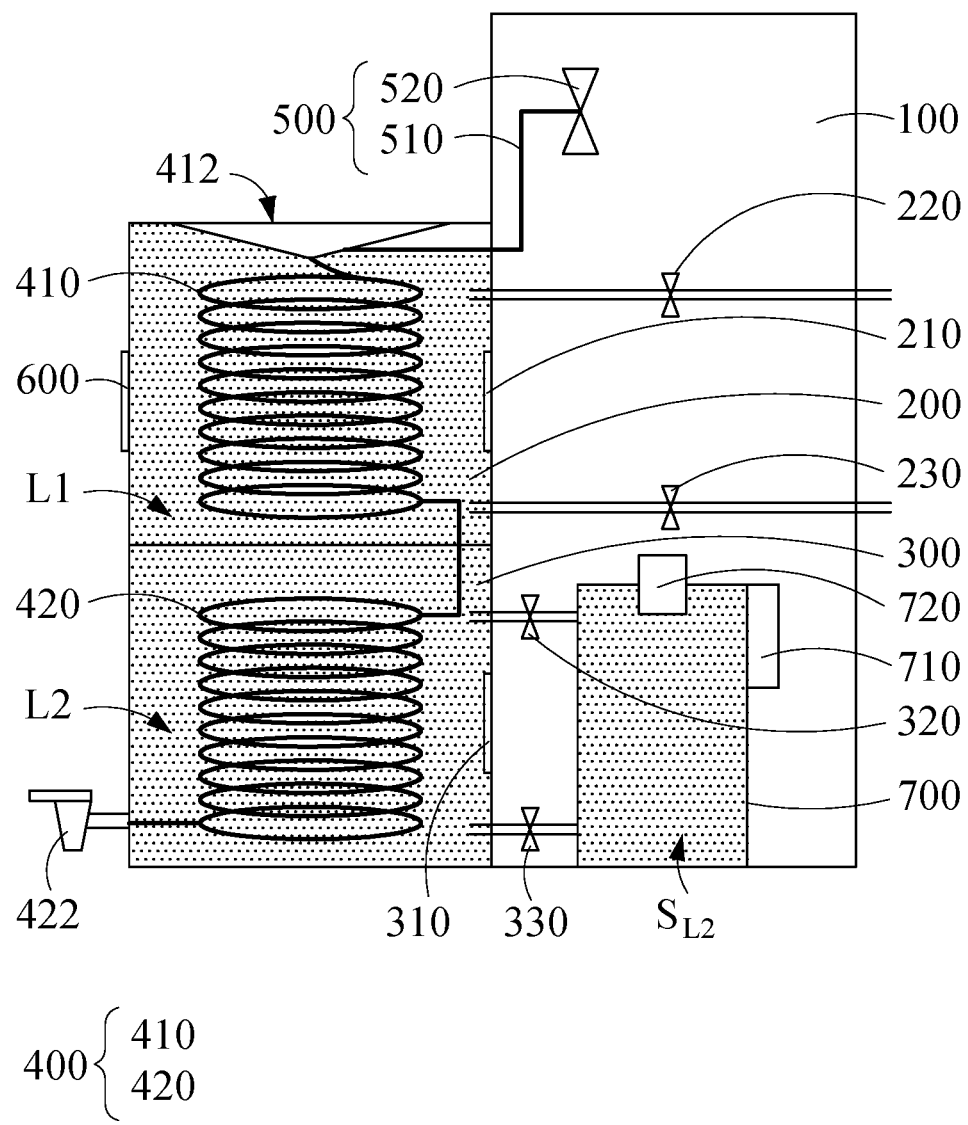
FIG. 6 is a schematic view of the internal elements of the beverage cooling device according to a fifth embodiment of the present disclosure.

Referring to FIG. 6, FIG. 6 is a schematic view of the internal elements of the beverage cooling device according to a fifth embodiment of the present disclosure. The beverage cooling device 1d of the present embodiment is similar to the beverage cooling device 1b of FIG. 4, the main differences between the two of them are: the beverage cooling device 1d further comprises a second coolant source tank 700, wherein the second coolant source $S_{L2}$ is configured within the second coolant source tank 700, and the intake valve 320 and the drain valve 330 of the second cooling tank 300 are connected to the second coolant source tank 700.

In order to reduce energy loss and waste of the second coolant L2, the present embodiment is changed to use a circulating module to maintain the temperature of the second coolant L2. Specifically, the second coolant source tank 700 is configured with a heat exchanger 710 and a pump 720, when the second temperature sensor 310 detects that the temperature of the second coolant L2 is higher than the second temperature threshold, the control unit 600 will open the intake valve 320 and the drain valve 330, and drive the pump 720 to introduce the second coolant source $S_{L2}$ into the second cooling tank 300 through the intake valve 320, and the drain valve 330 receives a high temperature second coolant L2 from the second cooling tank 300, at this time the control unit 600 will further start the heat exchange 710, the heat of the second coolant source $S_{L2}$ is dissipated to the outside to maintain the temperatures of the second coolant L2 and the second coolant source $S_{L2}$. In other embodiments, the second coolant source tank 700 may directly carry out heat dissipation by using the compressor 800, the chilling unit 810 and the heat dissipation unit 900, whereby the same effect may also be achieved.

Figure 7:
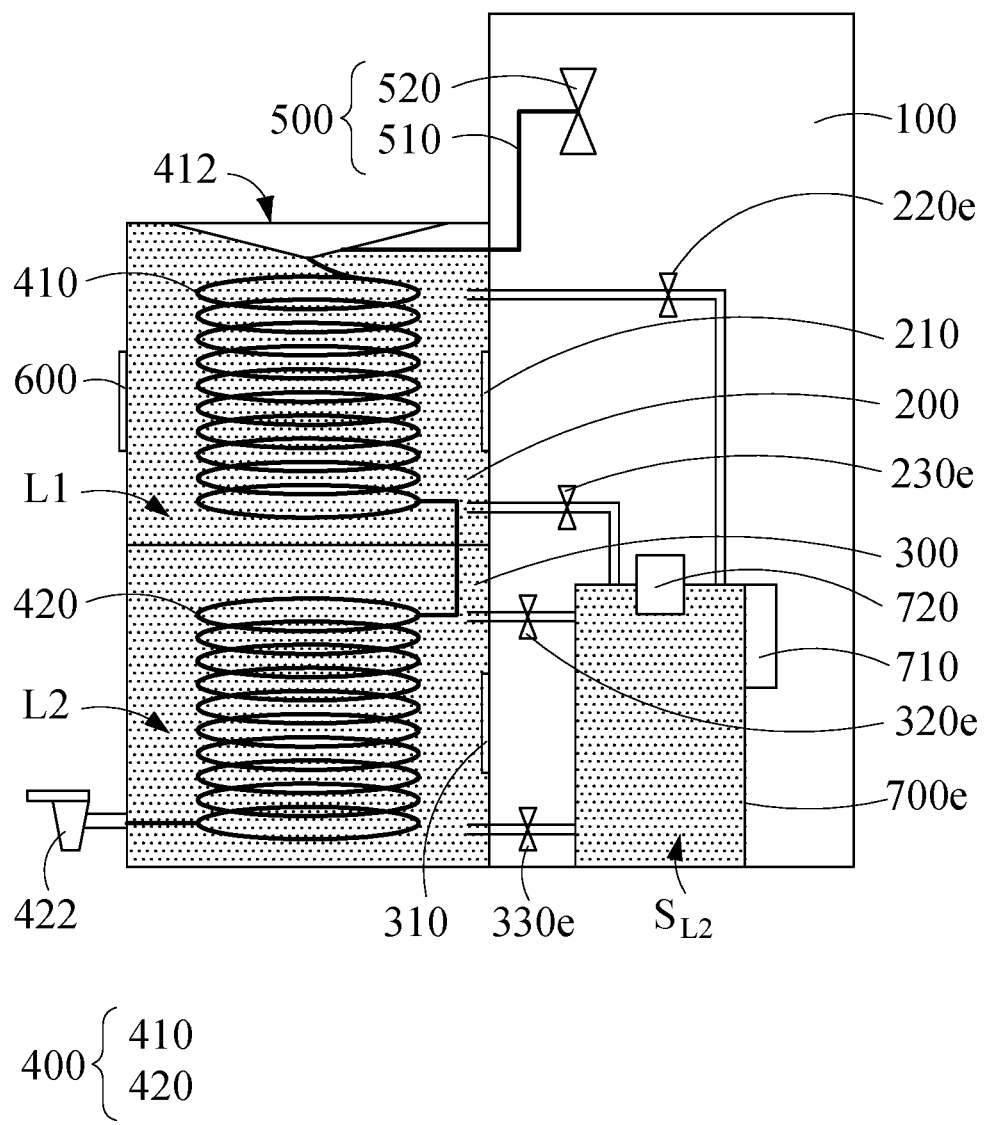
FIG. 7 is a schematic view of the internal elements of the beverage cooling device according to a sixth embodiment of the present disclosure.

Referring to FIG. 7, FIG. 7 is a schematic view of the internal elements of the beverage cooling device according to a sixth embodiment of the present disclosure. The beverage cooling device 1e of the present embodiment is similar to the beverage cooling device 1d of FIG. 6, the main differences between the two of them are: all the intake valve 220e and the drain valve 230e of the first cooling tank 200 as well as the intake valve 320e and the drain valve 330e of the second cooling tank 300 are connected to the coolant source tank 700e.

In detail, the coolant source tank 700e is configured with a coolant source S therein, and the temperature of the coolant source S is lower than or equal to the temperature of the second coolant L2. Thus, whether the coolant temperature inside the first cooling tank 200 or the second cooling tank 300 is higher than a predetermined threshold, the control unit 600 will open the corresponding intake valves 220e, 320e and the drain valves 230e, 330e, and drive the pump 720 to introduce the coolant source S into the first cooling tank 200 or the second cooling tank 300, in order to achieve the effect of maintaining the cooling capacity of the first cooling tank 200 and the second cooling tank 300. It is worth mentioning that, in other possible embodiments, the intake valve 220e and the drain valve 230e of the first cooling tank 200 as well as the intake valve 320e and the drain valve 330e of the second cooling tank 300 may also respectively be connected to a separate coolant source tank 700e, such a configuration may make the circulation of the two cooling tanks more flexible.

Figure 8:
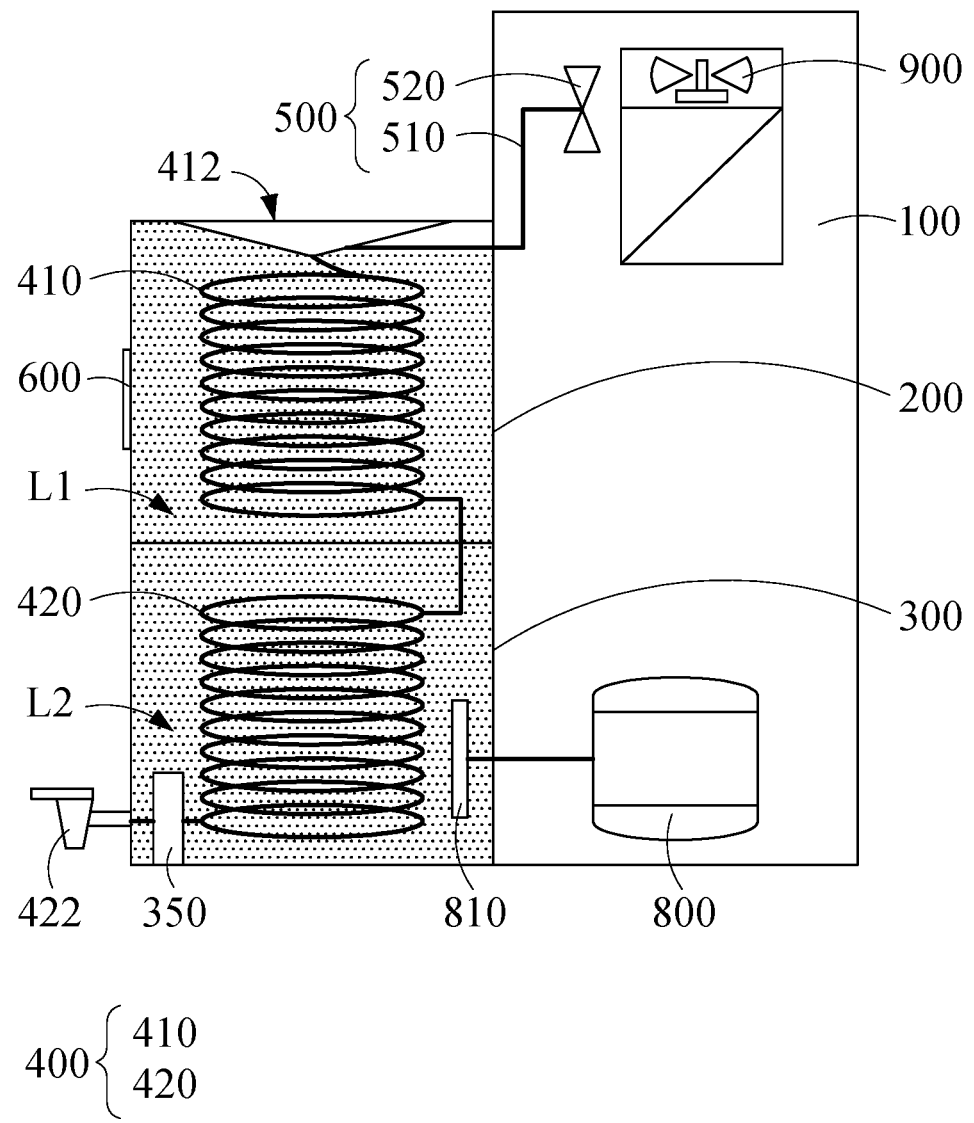
FIG. 8 is a schematic view of the internal elements of the beverage cooling device according to a seventh embodiment of the present disclosure.

Referring to FIG. 8, FIG. 8 is a schematic view of the internal elements of the beverage cooling device according to a seventh embodiment of the present disclosure. The beverage cooling device 1f of the present embodiment is similar to the beverage cooling device 1 of FIG. 2, the main difference between the two is that: the beverage cooling device 1f further comprises a beverage storage tank 350, wherein the beverage storage tank 350 is configured within the second cooling tank 300, and the beverage storage tank 350 is connected between the first pipeline 410 and the second pipeline 420 or between the second pipeline 420 and the outlet end 422, the present embodiment takes connecting between the second pipeline 420 and the outlet end 422 for example.

Different from the above-mentioned method that the beverage is injected and the low temperature beverage after cooled is obtained in a very short period of time, the sale mode of some beverage manufacturers is to pour a large number of beverages into the beverage machine first for cooling and reducing temperature, the cooled beverages is not outflowed from the beverage machine until the customer has a demand. For this mode, the beverage cooling device 1f may cool the injected beverage through the first pipeline 410 or/and the second pipeline 420, the injected beverage is first stored in the beverage storage tank 350, because the beverage storage tank 350 is configured in the second cooling tank 300, therefore, the stored low temperature beverage can be maintained at a low temperature for a long time, and an ice-cold beverage is obtained immediately when the customer has a demand.

Figure 9:
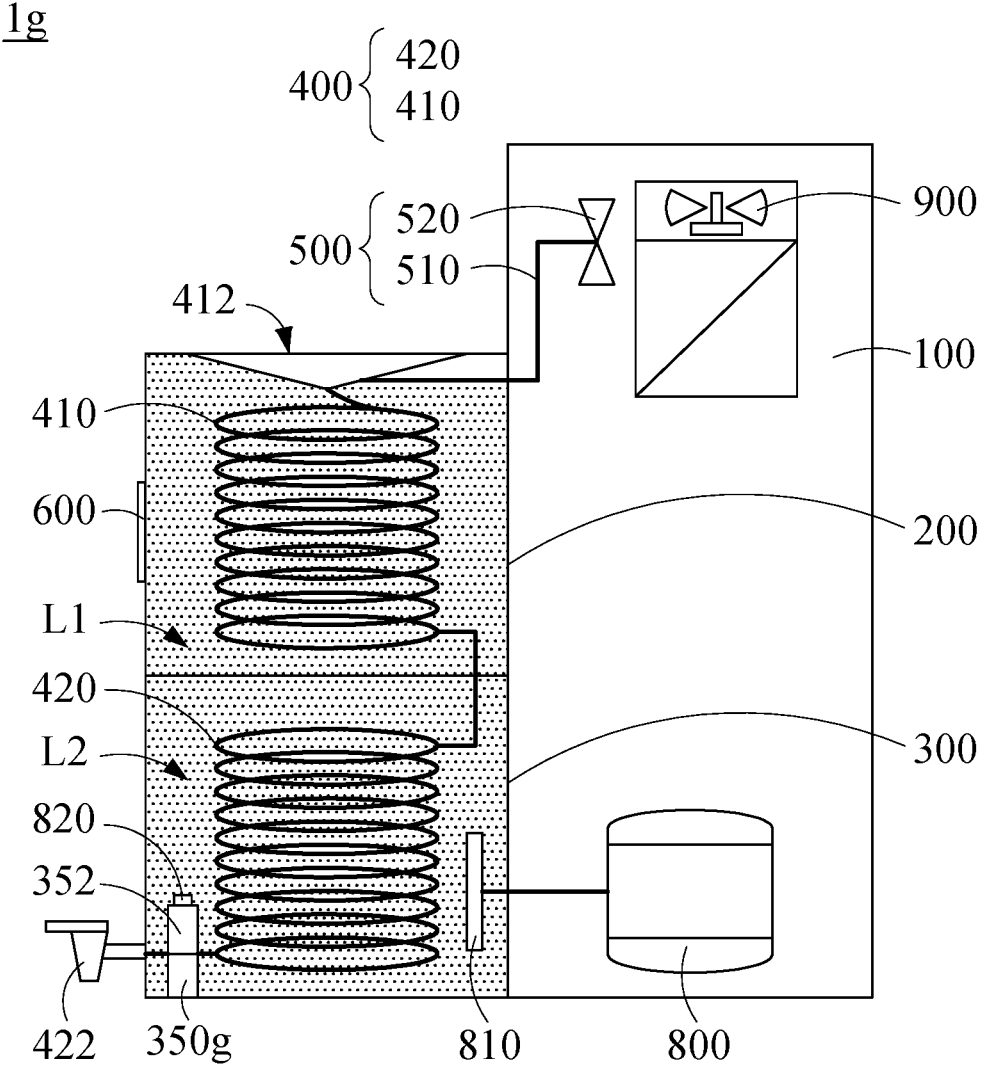
FIG. 9 is a schematic view of the internal elements of the beverage cooling device according to an eighth embodiment of the present disclosure.

Referring to FIG. 9, FIG. 9 is a schematic view of the internal elements of the beverage cooling device according to an eighth embodiment of the present disclosure. The beverage cooling device 1g of the present embodiment is similar to the beverage cooling device 1f of FIG. 8, the main difference between the two of them is that: the beverage cooling device 1g further comprises an ice making tank 352, wherein the ice making tank 352 is configured with an auxiliary chilling unit 820 thereon, and the first pipeline 410 or the second pipeline 420 is connected to the ice making tank 352.

If there is a need to use the original liquid ice cube (ice cube made from the beverage itself) at the time of making the beverage, the original liquid ice cube can be made directly through the beverage cooling device 1g. Specifically, the user may pour the beverage into the cooling pipeline 400, in the present embodiment, a downstream end of the second pipeline 420 is connected to the ice making tank 352 and the beverage storage tank 350g for storing part of general beverage, the auxiliary chilling unit 820 is connected to the compressor 800, for example, so that the temperature of the ice making tank 352 may be maintained at a temperature (e.g., −30° C.) lower than the other portions of the beverage storage tank 350g, and the ice making tank 352 is prepared with an ice mold therein in advance. Preferably, the ice making tank 352 or the entire beverage storage tank 350g is designed as a drawer type to be drawn out with respect to the body 100. Accordingly, when the customer has a demand, the user can provide a low temperature beverage, and add the original liquid ice cube made in the ice making tank 352 at the same time, whereby the flavor of the beverage is increased, and the temperature of the beverage can also be maintained for a longer time. In other possible embodiments, the pipeline connected to the ice making tank 352 may also be a pipeline independent of the cooling pipeline 400, the present disclosure does not limit these matters.

It is worth mentioning that the user may select and use the elements of the above different embodiments in combination according to the sale mode, the original temperature of the beverage and the desired temperature control mode and circulation mode, and the content of the above combination is still within the protective scope of the present disclosure.

While the present disclosure has been described by means of specific embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A beverage cooling device, comprising:
a body,
a first cooling tank, configured in the body and filled with a first coolant, wherein the first cooling tank is configured with a first temperature sensor;
a second cooling tank, configured in the body and filled with a second coolant, wherein a temperature of the second coolant is lower than that of the first coolant, the second cooling tank is configured with a second temperature sensor;
a cooling pipeline, including:
a first pipeline, configured in the first cooling tank and connected to an inlet end; and
a second pipeline, configured in the second cooling tank and connected to the first pipeline and an outlet end;
a cleaning module, configured in the body and including:
a cleaning pipeline, connected to a cleaning liquid source and the inlet end; and
a valve body, connected to the cleaning pipeline; and
a control unit, connected or electrically connected to the valve body;
wherein each the first cooling tank and the second cooling tank is respectively configured with an intake valve and a drain valve, and the first temperature sensor, the second temperature sensor, each intake valve and each drain valve are electrically connected to the control unit;
wherein when the first temperature sensor detects that the temperature of the first coolant is higher than a first temperature threshold, the control unit opens the intake valve and the drain valve of the first cooling tank, so that the temperature of the first coolant is lower than or equal to the first temperature threshold;
wherein when the second temperature sensor detects that the temperature of the second coolant is higher than a second temperature threshold, the control unit opens the intake valve and the drain valve of the second cooling tank, so that the temperature of the second coolant is lower than or equal to the second temperature threshold.

2. The beverage cooling device according to claim 1, wherein the second pipeline is coiled, the inlet end is suitable to inject a beverage, and a temperature of the beverage is higher than that of the second coolant.

3. The beverage cooling device according to claim 2, wherein the first pipeline is coiled, the number of turns of the second pipeline is greater than the number of turns of the first pipeline, and the temperature of the beverage is higher than that of the first coolant.

4. The beverage cooling device according to claim 1, further comprising a second coolant source tank, the second coolant source is configured within the second coolant source tank, the second coolant source tank is configured with a heat exchanger and a pump, the exchanger and the pump are electrically connected to the control unit, and the intake valve and the drain valve of the second cooling tank are connected to the second coolant source tank.

5. The beverage cooling device according to claim 1, further comprising a beverage storage tank, the beverage storage tank is configured within the second cooling tank, and the beverage storage tank is connected between the first pipeline and the second pipeline or between the second pipeline and the outlet end.

6. The beverage cooling device according to claim 1, further comprising an ice making tank, the ice making tank is configured with an auxiliary chilling unit thereon, and the first pipeline or the second pipeline is connected to the ice making tank.

7. The beverage cooling device according to claim 1, further comprising a compressor and a chilling unit, the compressor is electrically connected to the control unit, the first cooling tank and the second cooling tank are communicated to each other, and the chilling unit is connected between the compressor and the second cooling tank.

8. The beverage cooling device according to claim 7, further comprising a heat dissipation unit, the heat dissipation unit is connected to the compressor and electrically connected to the control unit.

9. The beverage cooling device according to claim 1, wherein tank walls of the first cooling tank and the second cooling tank are made of heat insulating materials.

* * * * *